United States Patent [19]

Sato et al.

[11] 4,219,718
[45] Aug. 26, 1980

[54] PROCESS AND APPARATUS FOR ELECTRICAL DISCHARGE MACHINING OF CYLINDRICAL WORK

[75] Inventors: Kunihiko Sato, Owari-Asahi; Tetsuro Urata; Tetsuhiro Asamoto, both of Nagoya; Kobun Asakawa, Fukuyama; Takeo Uebayashi, Fukuyama; Haruo Taguchi, Fukuyama, all of Japan

[73] Assignees: Mitsubishi Denki Kabushiki Kaisha; Nippon Kokan Kabushiki Kaisha, both of Tokyo, Japan

[21] Appl. No.: 920,987

[22] Filed: Jun. 30, 1978

[51] Int. Cl.² .............................................. B23P 1/08
[52] U.S. Cl. ............................... 219/69 M; 219/69 C
[58] Field of Search ................ 219/69 M, 69 P, 69 C, 219/69 S

[56] References Cited

U.S. PATENT DOCUMENTS

| | | | |
|---|---|---|---|
| 3,600,546 | 8/1971 | Niwa et al. | 219/69 M |
| 3,649,802 | 3/1972 | Sennowitz | 219/69 C |
| 3,694,599 | 9/1972 | Davis | 219/69 C |
| 3,697,719 | 10/1972 | Verner et al. | 219/69 S |
| 3,878,353 | 4/1975 | Anderson | 219/69 M |

FOREIGN PATENT DOCUMENTS 2153023 9/1971 France.

*Primary Examiner*—B. A. Reynolds
*Assistant Examiner*—Clifford C. Shaw
*Attorney, Agent, or Firm*—Fleit & Jacobson

[57] ABSTRACT

Disclosed are a process and apparatus for subjecting the outer surface of a satinizing roll to electrical discharge machining to produce a satin-like roughened surface of a uniform roughness. With this electrical discharge machining process, the electrical discharge machining speed of a plurality of electrodes mounted on a plurality of head columns is held lower than a steady state working speed until the electrodes on all the head columns start discharging, and in response to the detection of the discharge of every electrode on the head columns the working speed is changed to the steady state working speed and the head columns are simultaneously moved traversely along the axis of rotation of a cylindrical work, thus preventing the occurrence of a difference in the depth of erosion or stepped portions on the surface of the work during the initial working period. The apparatus for performing this electrical discharge machining process comprises a working power source including means for controlling the working speed, and detecting means for detecting that every electrode has started discharging so as to direct the working power source to change the working speed and so as to simultaneously actuate a head column transverse feed unit.

5 Claims, 3 Drawing Figures

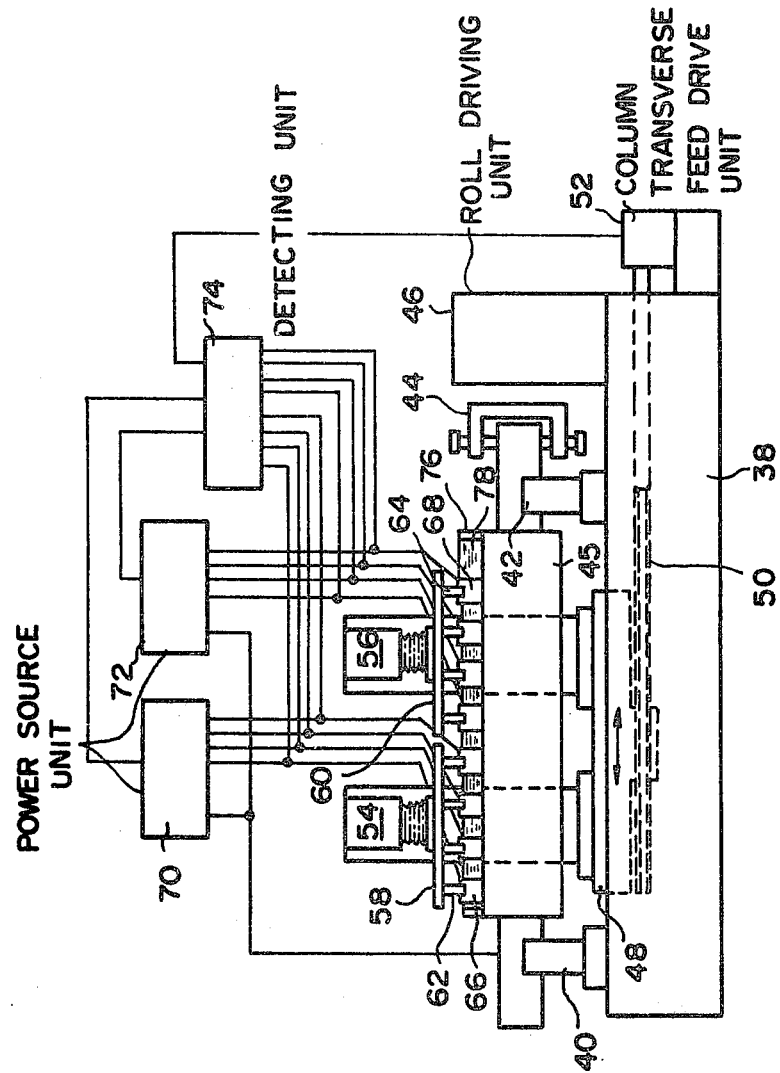

PROCESS AND APPARATUS FOR ELECTRICAL DISCHARGE MACHINING OF CYLINDRICAL WORK

BACKGROUND OF THE INVENTION

The present invention relates to electrical discharge machining processes for satinizing by electrical discharge the outer surface of a cylindrical work to give a satiny finish of a predetermined surface roughness, and more particularly the invention relates to an improved electrical discharge machining process and apparatus designed to prevent the occurrence of stepped portions on the surface of a roll during the initial period of the electrical discharge machining.

In the past, the method of throwing hard metal particles, e.g., shot or grit, at the polished surface of strip rolling rolls, particularly cold rolling rolls, to produce impressions on the roll surface, has been used as a means of giving a satinlike finish to the surface of such roll, and recently attempts have been made to replace this type of process by electrical discharge machining. As is well known, the electrical discharge machining is a process in which an insulating liquid, e.g., kerosene, is placed in the small discharge gap between an electrode and a work piece and a pulse voltage is periodically applied across the electrode and the work piece, thus working the surface of the work piece. By repeatedly carrying out this electrical discharge machining at the surface of a roll while rotating the roll in the circumferential direction and also gradually moving the electrode in the lengthwise direction of the axis of rotation of the roll, it is possible to continuously give a spiral satiny finish to the roll surface and thereby to produce spark eroded impressions all over the roll surface. This is the known method of giving a uniform satiny finish to the surface of a roll surface by means of electrical discharge machining. The satinfinished surface produced in this way has many advantages, that is, not only the roughness is more marked and the shape is in excellent trim as compared with the mechanical impressions produced by the throwing of metal particles, but also the shape is not affected by the manufacturing method, hardness, etc., of the roll, the metal structure in the roll surface being hardened by the electrical discharge, thus making the roll best suited for rolling purposes and so on.

With the more recent roll machining processes, the machining is performed by using a multi-piece electrode to reduce the working time, and as a result where an extremely large number of split electrodes are used, in order to prevent deterioration in the split electrode working efficiency and ensure mechanical structural stability, a method has been proposed in which a plurality of head columns (a head and a column are considered as a unit and the unit is hereinafter referred to as a head column) are arranged to face a roll, and a plurality of split electrodes are mounted on each of the head columns, whereby the plurality of head columns are moved along the axis of rotation of the roll during the operation to effect the machining of the roll.

A disadvantage of this method is that, since the feeding of the electrode spindles at each head column is controlled independently, the working at each head column is started at a different time in some cases, with the result that if the movement of a plurality of the head columns along the axis of rotation of the roll is initiated at the instant that the working is started at one of the head columns, the working rate around the working initiating position of each of the plurality of the other head columns is decreased, and consequently the radial length of the roll at these portions increases as compared with that at the other portions. On the contrary, if all of the head columns are held in their initial positions until the working is started at every head column, as compared with the working rate at the head column which is brought into operation finally, the working rate at the head column which was put into operation earlier is increased, thus decreasing the radial length of the roll. In particular, this effect will be more marked in cases where the working conditions are preset to produce a surface of a greater surface roughness, thus causing stepped portions on the roll surface. These stepped portions will be a serious defect in the case of a roll used for example in the final rolling of sheet steel, and any roll worked in this way cannot be put into use. Such stepped portions can be checked by rubbing the roll surface with an oil-stone.

SUMMARY OF THE INVENTION

The present invention has been made to overcome the foregoing deficiencies in the prior art which occur during the initial period of electrical discharge machining.

It is therefore an object of the present invention to provide an electrical discharge machining process wherein the working speed during the initial working period is preset to a value which is lower than the working speed during the steady working period, whereby when it is detected that discharge has occurred at every electrode, the initial working speed is changed to the value preset for the steady working period and, at the same time, transverse feeding of a plurality of head columns carrying a plurality of electrodes is started to thereby prevent the occurrence of stepped portions on the roll surface during the initial working period.

It is another object of the invention to provide an electrical discharge machining process wherein the working speed during the initial working period is preset lower than a working speed obtained in accordance with a relation between the amount of metal removed by working, giving a limit to the occurrence of stepped portions and the number of times of working.

It is still another object of the invention to provide an electrical discharge machining process wherein the transition from one working speed to another is accomplished by controlling the waveform of a voltage pulse applied across each electrode and a cylindrical work.

It is still another object of the invention to provide an electrical discharge machining apparatus comprising a working power supply unit including means for effecting the transition from one working speed to another, and detecting means for detecting that every electrode has discharged so as to generate a working speed change command and so as to simultaneously actuate a column head transverse feed means.

Other and further objects, features and advantages of the present invention will appear more fully from the following description.

BRIEF DESCRIPTION OF THE DRAWINGS

FIG. 3 is a schematic block diagram showing an embodiment of an electrical discharge machining apparatus for performing the electrical discharge machining process of this invention.

DESCRIPTION OF THE PREFERRED EMBODIMENT

Figure 1:
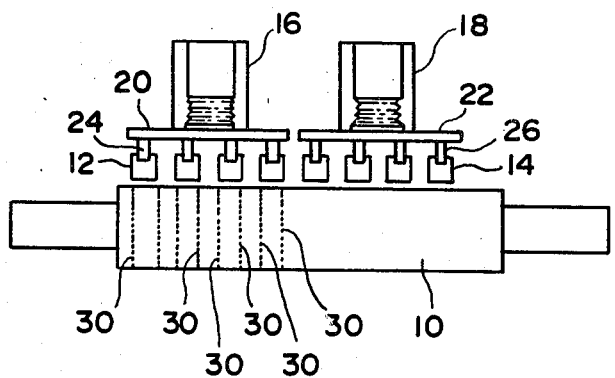
FIG. 1 is a partial schematic diagram of an electrical discharge machining apparatus which is useful for explaining the cause of stepped portions produced on the surface of a roll by a prior art electrical discharge machining process.

FIG. 1 shows a part of a prior art electrical discharge machining apparatus which is useful for explaining the phenomenon causing stepped portions on the surface of a roll by a prior art electrical discharge machining process during the initial working period.

In the Figure, numeral 10 designates a rotatably supported roll adapted to be rotated at a constant speed from a roll driving unit which is not shown. Numerals 12 and 14 designate respectively a plurality of electrodes disposed to face the surface of the roll 10 with a predetermined discharge gap therebetween, and numerals 20 and 22 designate electrode holders on which are respectively mounted the electrodes 12 and 14 through the intermediary of insulators 24 and 26, respectively, namely; the four electrodes 12 are separately arranged on the electrode holder 20 at predetermined intervals and also the four electrodes 14 are separately mounted on the electrode holder 22. Numerals 16 and 18 designate head columns on which are respectively mounted the electrode holders 20 and 22, and the head columns 16 and 18 are movable in the lengthwise direction of the axis of the roll 10 by a column transverse feed unit which is not shown. Now assuming that the electrodes mounted on one or the other of the head columns 16 and 18 (for example, the electrodes 12 mounted on the head column 16) start discharging during the initial working period, the initiation of the discharge at the electrodes 12 is detected and thus the movement of the head columns 16 and 18 is initiated in response to the actuation of the column transverse feed unit which is not shown. Consequently, the electrodes 14 mounted on the head column 18 are caused to discharge after the head columns 16 and 18 have been caused to start moving. In other words, even if the discharge starting time of the electrodes 12 mounted on the head column 16 differs from that of the electrodes 14 on the head column 18, since the head columns 16 and 18 are moved by detecting the initiation of discharge at the electrodes mounted on one or the other of the head columns 16 and 18, there are cases where there occurs a difference in the number of times of working between the surface of the roll 10 facing the electrodes 12 and the surface of the roll 10 facing the electrodes 14 located adjacent to the electrodes 12, thus causing stepped portions 30 on the surface of the roll 10.

In this connection, the electrodes 12 mounted on the head column 16 are so positioned that discharge is caused simultaneously between each of the electrodes 12 and the roll 10, and this is the same with the electrodes 14 on the head column 18.

Next, the relationship between the stepped portions produced on the surface of the roll 10, the difference in number of times of working, and the working speed will be considered experimentally. The electrical discharge machining was carried out under the following experimental conditions, that is, the electrodes 12 and 14 were arranged to face the uniformly finished surface of the roll 10 through the predetermined discharge gap and the head columns 16 and 18 were not moved in the lengthwise direction of the axis of rotation of the roll 10 by stopping the transverse feeding. On the basis of the results of this experiment, the numbers of times of working which caused stepped portions on the surface of the roll 10 were examined and it was found that a stepped portion would be caused at the boundary between the unworked roll surface portion and the worked roll surface portion when the metal removed per unit area in the worked zone exceeded a certain value. In other words, in accordance with the experiment, the following experimental equation was obtained $$C \leq m \times N = (M/W \times L)N \tag{1}$$

where
 C = amount of metal removed (g/cm$^2$) per unit area representing a limit to the occurrence of stepped portion and used as a constant
 m = amount of metal removed (g/cm$^2$) per unit area per working
 N = difference in number of times of working causing a stepped portion
 M = working speed representing amount of metal removed (g/min) per unit time
 W = electrode width (cm)
 L = roll circumferential speed (cm/min)

When the working speed M = 0.466 (g/min), the electrode width W = 5.0 (cm) and the roll circumferential speed L = 600 (cm/min), a stepped portion started to appear at the difference in number of times of working N = 4. In this case, the constant C representing the limit to the occurrence of a stepped portion is given as follows from the above equation (1)

$$C = m \times N = 0.466/5 \times 600 \times 4 \approx 6.2 \times 10^{-4} (g/cm^2)$$

Thus, the following relation holds between the amount of metal removed m and the difference in number of times of working N $$6.2 \times 10^{-4} \leq m \times N \tag{2}$$

From the equation (2), we obtain $$N = (6.2 \times 10^{-4}) \, 1/m \tag{3}$$

Figure 2:
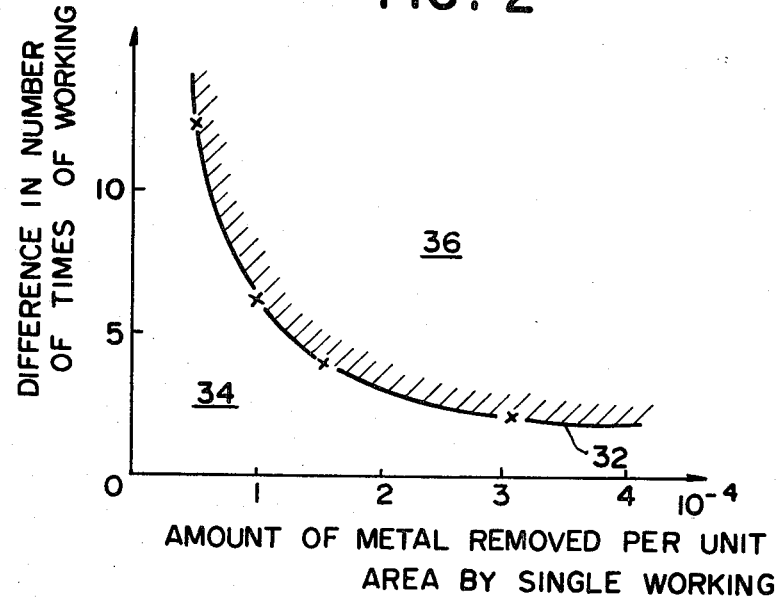
FIG. 2 is a graph showing the experimentally obtained stepped portion originating zones in terms of the relation between the number of times of working N and the amount of metal removed by working m.

The resulting relation between the amount of metal removed m and the difference in number of times of working N is shown by the graph of FIG. 2. As will be seen from the Figure, there exists an inversely proportional relation between the amount of metal removed m(g/cm$^2$) represented by the abscissa and the difference in number of times of working N represented by the ordinate, and it will be seen that no stepped portion will be caused on the roll surface if the amount of metal removed and the difference in number of times of working fall within a region 34 to the lower left of a curve 32, and stepped portions will be caused if the amount of metal removed and the difference in number of times of working fall within a region 36 to the upper right of the curve 32. As a result, by setting the amount of metal removed m per unit area to a small value during the intial period of working it is possible to eliminate the occurrence of stepped portions even though the difference in number of times of working N is increased.

In this case, the amount of metal removed m is given as follows from the above equation (1)

$$m = M/W \times L \qquad (4)$$

Thus, if the electrode width W and the roll circumferential speed L are fixed, then the amount of metal removed m is proportional to the working speed M. Thus, in order that the difference in number of times of working N may be sufficiently large within the limit of causing any stepped portions in FIG. 2, it is necessary to establish working conditions which would reduce the working speed M to a sufficiently small value and in this way the occurrence of any stepped portions can be prevented even though the working starting times of the head columns 16 and 18 are different from each other.

The electrical discharge machining process according to the invention has been completed on the basis of the above-mentioned analysis of the causes of stepped portions on the roll surface during the initial working period. Thus, there is provided an electrical discharge machining process wherein the working conditions are predetermined in such a way that the working speed during initial working period is selected lower than a desired value, whereby when the working is started at each of the electrodes on a plurality of head columns, an electrical change caused by the starting of the working is detected as a signal to change the working speed to the desired value and also the head columns are started to move along the axis of rotation of a roll to thereby produce the roll with no stepped portions.

FIG. 3 shows an electrical discharge machining apparatus for performing the process according to the present invention, and the apparatus comprises two head columns as in the prior art apparatus of FIG. 1.

In the Figure, numeral 38 designates a bed, 40 and 42 bearings mounted on the bed 38, 45 a work piece or roll supported in a horizontal position by the bearings 40 and 42, 44 a dog for chucking one end of the roll 45, and 46 a roll driving unit mounted on the bed 38 to rotate the roll 45 at a constant speed through the dog 44. Numeral 48 designates a movable base which is threadedly cconnected to a feed screw 50 which in turn is turned by a column transverse feed drive unit 52 to cause the movable base 48 to slide over the bed 38 in the lengthwise direction of the axis of rotation of the roll 45. Numerals 54 and 56 designate head columns fixedly mounted on the movable base 48, 58 and 60 electrode holders mounted respectively on the head columns 54 and 56, and 66 and 68 electrodes respectively mounted on the electrode holders 58 and 60 through insulators 62 and 64, respectively. Each of the electrodes 66 and 68 consists of a group of four split electrodes, and the electrodes are preliminarily positioned so that the electrodes are caused to start discharging simultaneously group by group.

Numerals 70 and 72 are power supply units for electrical discharge machining, and the power supply unit 70 is adapted to apply a sufficient voltage pulse to cause a discharge between the electrodes 66 on the head column 54 and the roll 45, and it also includes means for controlling the waveform of the voltage pulse to reduce the working speed during initial working period. The voltage pulse waveform control means comprises control means for controlling the off time of the voltage pulse to regulate the working speed. Numeral 74 designates a detecting unit whereby, when it is detected that all of the electrodes 66 and 68 mounted on the head columns 54 and 56 have started discharging, a detection signal is generated and applied to the working power supply units 70 and 72 as a command signal for changing the working conditions, and the working speed initially set to a value smaller than the steady working speed is changed to the steady working speed. The detection output signal of the detecting unit 74 is also applied as an actuation signal to the column transverse feed driving unit 52 so that, as soon as all of the electrodes 66 and 68 mounted on the head columns 54 and 56 start discharging, the column transverse feed drive unit 52 is brought into operation and the head columns 54 and 56 are reciprocated from side to side. To detect whether the electrodes 66 and 68 have started to discharge, the detector unit 74 monitors the voltage or current in the electrodes 66 and 68 and the occurrence of discharge at every electrode is detected in the form of a logical product of the discharge detection signals from the electrodes. Numeral 76 designates a working tank supported in place above the roll 45, and it is constructed so that the working tank 76 is filled with a working liquid 78 supplied from a pump which is not shown and consisting of an insulating liquid such as kerosene in which the electrodes 66 and 68 are immersed, and the working liquid 78 overflown from the working tank 76 is filtered and returned to the working tank 76.

While the working power supply units 70 and 72 have their positive electrodes connected to the electrodes 66 and 68, respectively, and their negative electrodes connected to the roll 45, the power supply units 70 and 72 may be connected in the reverse manner. The feeding of the spindles of the electrodes 66 and 68 in the radial direction of the roll 45 is controlled separately for each of the head columns 54 and 56 by control means which are not shown.

Next, the electrical discharge machining process according to the invention will be described. Firstly, the electrodes 66 and 68 are mounted respectively on the electrode holders 58 and 60 with an electrode mounting pitch corresponding to the working width of a roll. The working liquid 78 is then fed into the working tank 76, and the roll 45 is rotated at a constant speed by the roll driving unit 46 while presetting the working conditions of the working power supply units 70 and 72 so as to make the working speed lower than the desired value for the steady working. Thereafter, when the detector unit 74 detects that both the electrodes 66 and 68 on the head columns 54 and 56 have discharged, the resulting detection signal controls the working conditions of the working power supply units 70 and 72 to change the working speed to the desired value under the steady working condition and, at the same time, the column transverse feed drive unit 52 is brought into operation thus causing the head columns 54 and 56 to start moving along the axis of rotation of the roll 45.

Then, the head columns 54 and 56 are repeatedly reciprocated over a distance corresponding to the electrode mounting pitch until a satiny finish is given to the entire outer surface of the roll 45. By thus working the roll, it is possible to produce a roll which has been uniformly satinized without any stepped portions.

It will thus be seen from the foregoing that in accordance with the process according to the present invention, the working speed during initial working period is preset to a value lower than the desired value, whereby when discharge occurs at every electrode mounted on the head columns, this is detected, and the resulting detection signal controls the working conditions to change the working speed to the desired value while simultaneously moving the head columns along the axis of rotation of the roll, thus preventing the occurrence of any stepped portions on the roll surface during the initial working period and thereby proving a great practical utility of the invention.

What is claimed is:

1. In an electrical discharge machining process wherein a plurality of head columns each having a plurality of electrodes disposed to face a cylindrical work are provided, and said plurality of head columns are moved along the axis of rotation of said cylindrical work by column transverse feed drive means to give a satiny finish to an outer surface of said cylindrical work, the improvement comprising:

determining working conditions for an initial working period so as to set a working speed for the initial working period to a value smaller than a predetermined desired working speed under a steady working condition;

detecting initiation of discharge between every one of the plurality of electrodes mounted on said head columns and said cylindrical work;

in response to said detecting step, changing the working speed from said working speed under initial working condition to said predetermined working speed under steady working condition, thereby changing said determined working conditions; and moving said plurality of head columns along the axis of rotation of said cylindrical work in synchronism with said change of working conditions;

whereby to eliminate the occurrence of stepped portions on the surface of said cylindrical work due to a difference in the number of times of working during the initial working period between said head columns.

2. A process according to claim 1, wherein said working speed for said initial working period is preset lower than a working speed obtained by dividing a predetermined amount of metal removed which causes said stepped portions by a given number of times of working which causes said stepped portions.

3. A process according to claim 2, wherein said setting and change of working speed are effected by controlling a waveform of a voltage pulse applied across said plurality of electrodes and said cylindrical work.

4. A process according to claim 3, wherein said setting and change of working speed are effected by controlling an off time of said voltage pulse applied across said plurality of electrodes and said cylindrical work.

5. In an electrical discharge machining apparatus having a plurality of head columns, each including a plurality of electrodes mounted thereon to face a cylindrical work, and said apparatus further comprising column transverse feed driving means for moving said plurality of head columns along the axis of rotation of said cylindrical work to give a satiny finish to an outer surface of said cylindrical work, the improvement comprising:

working speed control means for applying a voltage pulse across the plurality of electrodes mounted on said head columns and said cylindrical work at a lower working speed during an initial working period; and detecting means for detecting the initiation of discharge between each day of the plurality of electrodes on said head columns and said cylindrical work, said detecting means being responsive to the initiation of discharge at every one of said electrodes for applying a working speed change command to said working speed control means so as to cause said working speed control means to apply said voltage pulse across said plurality of electrodes mounted on said head columns and said cylindrical work at a higher working speed during a steady working period;

said column transverse feed drive means being simultaneously actuated to move said head columns along the axis of rotation of said cylindrical work.

* * * * *